US005974948A

United States Patent [19]

Thompson et al.

[11] Patent Number: 5,974,948

[45] Date of Patent: Nov. 2, 1999

[54] LINEAR ACTUATOR

[75] Inventors: Brian K. Thompson; Theodore S. Zajac, Jr., both of Elyria; Theodore S. Zajac, Sr., Westlake, all of Ohio

[73] Assignee: Zaytran, Inc., Elyria, Ohio

[21] Appl. No.: 09/015,159

[22] Filed: Jan. 29, 1998

[51] Int. Cl.[6] .......... F16J 15/18

[52] U.S. Cl. .......... 92/165 PR; 92/166

[58] Field of Search .......... 92/165 R, 165 PR, 92/166

[56] References Cited

U.S. PATENT DOCUMENTS

| | | | |
|---|---|---|---|
| 4,119,017 | 10/1978 | Nusbaumer | 92/165 PR |
| 4,982,652 | 1/1991 | Blatt | 92/165 PR |
| 5,351,599 | 10/1994 | Stoll | 92/165 PR |

FOREIGN PATENT DOCUMENTS

| | | | |
|---|---|---|---|
| 2210517 | 9/1973 | Germany | 92/165 PR |
| 2434302 | 1/1976 | Germany | 92/165 PR |
| 2521364 | 11/1976 | Germany | 92/165 PR |

OTHER PUBLICATIONS

BTM Drawing (1 sheet) ( Not Dated).

Progressive Tool & Industries Co. Drawing (2 sheets) (Not Dated).

BTM Corporation catalog pages – Series Precision Part Locator (p. 27) and Series Precision Part Locator – Metric (p. 26) and drawing (1 sheet), May 8, 1995.

Welker Bearing Company catalog pages – Shot Pin & Lock–Out Pin Packages with Omni Mounts, pp. 1–14; Welker Products product sheet (Not Dated).

Tünkers Maschinenbau GmbH catalog pages – Retractable Locating Pin (3 pages) (Not Dated).

Genus Technologie Industrielle catalog pages – Porte Pilote ø20 Course 75/100 Verin ø63; Porte Pilote ø20 Course 25/50 Verin ø63 (2pages), Jun. 19, 1997.

*Primary Examiner*—Thomas E. Denion
*Attorney, Agent, or Firm*—Renner, Otto, Boisselle & Sklar

[57] ABSTRACT

A piston and cylinder assembly for use in actuating a locating pin for sheet metal provides stability for a pin mounted thereon against side to side movement and rotation. To this end the assembly includes a cylinder body assembly with an internal bore and a piston axially slidable within the bore. A piston rod is connected with the piston, and the rod has a free end for connection of a sheet metal locating pin. A first guide surface is formed within the cylinder body assembly and a second guide surface is formed on one of the piston and piston rod, the first and second guide surfaces cooperating to prevent rotation of the piston and piston rod as the piston and piston rod slide axially with respect to the cylinder body assembly. The first and second guide surfaces preferable are internal and external splines. First and second bearings are connected to the cylinder body assembly and support the piston rod for straight line movement. The first and second bearings being located on opposite sides of the piston. One of the bearings may be the splines.

19 Claims, 3 Drawing Sheets

LINEAR ACTUATOR

FIELD OF THE INVENTION

The present invention relates to linear actuators and in particular to a linear actuator which is suitable for positioning a locating pin used in the assembly of sheet metal parts, for example, to assemble automobile bodies.

BACKGROUND OF THE INVENTION

In many manufacturing processes individual sheet metal parts are fabricated with locating holes. The sheet metal is positioned using pins which extend through these holes while welding of the parts occurs. Locating pins hold the sheet metal parts in position relative to each other and to the overall assembly. Accurate positioning of the pins assures that a consistent assembly is created during the welding process.

Some locating pins can be fixed to the frame of the equipment. These pins do not move. However, many pins must be retracted from the completed sheet metal assembly so that it can progress to the next station in the manufacturing process. Such locating pins are mounted on linear actuators which move them between extended and retracted positions. Locating pins which are retractable are subject to side to side deflection when they are in their extended positions. This deflection must be minimized if the sheet metal is to being reliably and repeatably located in the proper position. This goal is especially difficult to achieve during a welding process when heat from welding guns causes the sheet metal to expand.

Equipment used to support sheet metal during sheet metal welding operations often has limited space available for locating pins and their actuators. Therefore, it is often necessary for some of the locating pins to be attached to their actuators with an offset in order to allow the pin to fit around some other part of the equipment. The requirement of using a locating pin which is offset from the center line of its actuator requires the actuator to be firmly held against rotation.

The welding environment is a very challenging one for precision actuators. Weld spatter consists of very hard particles ranging in size from molecular to ⅛ of an inch in diameter, or more. This range of size coupled with very high temperatures makes the welding environment a harsh one for a precision actuator. If spatter is able to enter an actuator, the very hard particles cause rapid wear and premature failure of the actuator.

Locating pin actuators have consisted of a bearing system and piston and cylinder arrangement. The bearing system consists of a relatively long bearing housing in which a shaft is fitted. At one end of the shaft there is a provision to attach a locating pin, at the other end of the shaft provision is made to attach the piston and cylinder assembly.

There are three commonly used methods of providing a non-rotating feature to the shaft and bearing housing assembly. In one, arrangement to shaft is made square with a matching square bearing housing. In another arrangement the shaft is round with a flat ground onto one side. A flat bearing is then installed in the side of the bearing housing to engage this flat. In all implementations of locating pin actuators, a rod scraper is provided in an attempt to keep the weld spatter from entering the bearing system.

Prior art locating pin actuators have some deficiencies. You order to achieve the necessary limitation on side to side deflection, the bearing the assembly must be relatively long.

This long bearing can be expensive to fabricate, and it may be difficult to utilize in tight places.

The actuators which use a square shaft are hard to fabricate. Consistently matching a square bearing to a square shaft in a high production environment is technically challenging. In addition, there must be some clearance between the shaft in the bearing so that the actuator can function smoothly. When torque is applied to the output shaft, as from an offset locating pin, the four corners of the shaft will contact the bearing surface. This minimal surface area of contact causes the bearing housing to wear rapidly. In addition, a square shaft can be hard to seal with a rod scraper. Therefore, it is common to use a shroud attached to the shaft which completely covers the exposed bearing surface. The shroud occupies additional space, making this arrangement even more difficult to fit into cramped quarters.

Actuators that use a flat surface ground into a round shaft to limit rotation are easier to manufacture than the square shaft arrangement because the grinding process is controllable, even in a high production environment. However, actuators which use a flat surface on a round shaft to limit rotation tend to wear rapidly because there is only a single point of contact between the flat and the bearing when a torque is applied to the shaft.

SUMMARY OF THE INVENTION

The present invention provides a linear actuator which is compact and precisely positions a locating pin, even when the pin is offset from the axis of the actuator. The actuator includes a housing assembly with a cylinder between a pair of bearing surfaces. A piston rod assembly moves linearly within the housing when fluid pressure is applied. One end of the piston rod assembly (the lead end) has a cylindrical exterior surface which is a sliding fit with a corresponding bearing surface in the housing assembly. The rear end of the piston rod assembly is formed with an external spline. This spline meshes with a corresponding internal spline formed in the rear end of the housing assembly to support the piston rod against side to side movement and against rotation. A piston is connected rigidly to the piston rod between the two bearing surfaces. The lead end bearing surface may be applied directly to the base metal of a component of the housing assembly rather than being a separate piece to decrease cost and increase rigidity.

DESCRIPTION OF PREFERRED EMBODIMENTS

Figure 1:
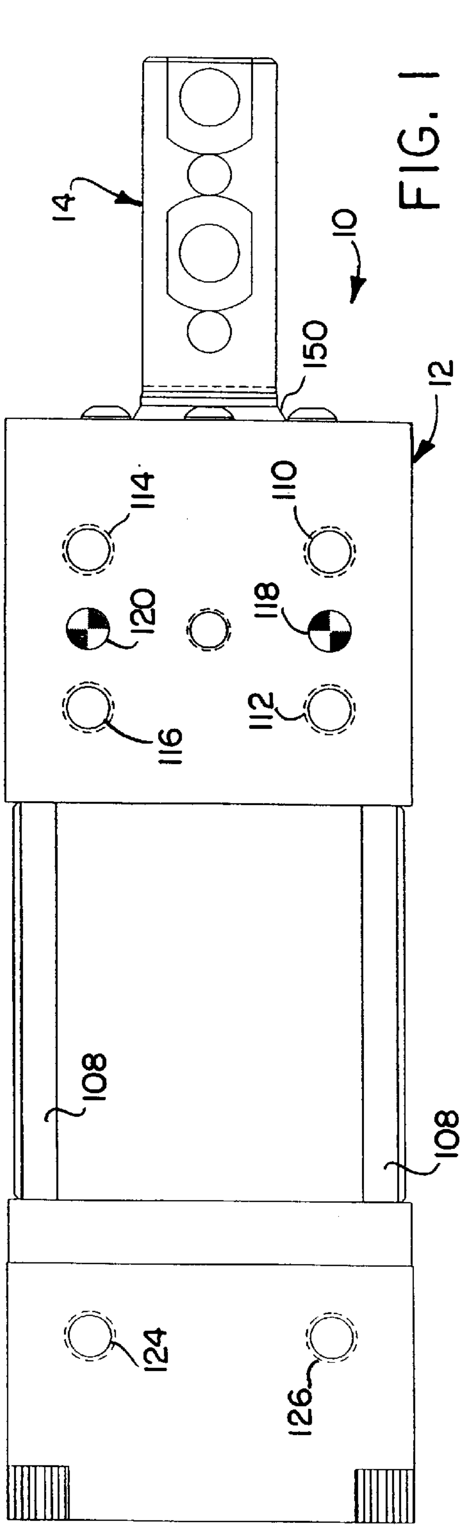
FIG. 1 is a top plan view of a linear actuator constructed in accordance with the present invention.

The linear actuator 10 (FIGS. 1 and 7) includes a housing assembly 12 and piston rod assembly 14. The piston rod assembly 14 is movable between a retracted position illustrated in FIGS. 1, 2, and 3 and an extended position shown in phantom in FIG. 3. As is discussed below, the piston rod assembly 14 may carry one of a variety of locating pins, such as the offset locating pin 212 shown in FIG. 7.

The housing assembly 12 comprises (from right to left in FIG. 3) a rod end cap 16, a cylinder 18, a female or internal spline housing 20, and a rear cap 22. The piston rod assembly 14 fits within and slides with respect to the housing assembly 12. The rear cap 22 and the spline assembly 20 may be viewed as forming a rear cap assembly since together they cover the rear end portion (the left end as viewed in FIG. 3) of the piston rod assembly 14.

The rod end cap 16 includes a centrally located rod end or lead end bearing surface 30. This bearing surface 30 is cylindrical and extends through the rod end cap. The piston rod assembly 14 includes a cylindrical surface 32 which is machined to slide smoothly within the rod end bearing surface 30.

The internal spline housing 20 (FIGS. 3 and 5) includes a centrally located female spline 36. The rear end portion of the piston rod assembly 14 includes an external spline 38 (FIGS. 3 and 4) which is a tight sliding fit inside the internal spline 36 of the internal spline housing 20. Together the internal spline 36 and the rod end bearing surface 30 support the piston rod assembly at two spaced apart locations. The spacing apart of the lead end bearing surface 30 and the internal spline 36 assists in accurately positioning the piston rod, especially when it is subjected to lateral loads that may arise during use of the actuator to position sheet metal. The cooperation of the internal spline 36 (FIGS. 3 and 5) with the external spline 38 (FIGS. 3 and 4) prevents rotation of the piston rod assembly 14. It will be appreciated by those skilled in the art that the use of a twenty toothed spline to resist rotation results in greatly reduced wear and longer life in part because torsional forces are distributed over a larger surface area than in the prior art square shaft deigns.

It is preferred that the lead end bearing surface 30 be formed by treating the material of which the rod end cap 16 is formed. The rod end cap 16 has successfully been manufactured from aluminum. The lead end bearing surface 30 may be formed of a ceramic matrix which is applied directly to a bore formed in the rod end cap 16, rather than as a sleeve which is pressed in. In the manufacturing operation, a bore is formed through the rod end cap 16, and then the surface of the bore is treated to make it highly heat resistant with a low coefficient of friction. Many different materials may be used for this purpose including Rulon® available through Dixon Industries, Bristol, R.I., sintered bronze, $Al_2O_3$ (Hard Anodized Aluminum), or $MoS_2$ (Molybdenum Disulfide).

The bearing surface 30 fits closely around the cylindrical surface 32 of the piston rod assembly 14. The quality of the surface finishes on the cylindrical surface 32 and the rod end bearing surface 30 will depend upon the accuracy and precision required of the linear actuator in its particular use. Where highly accurate positioning of a locating pin is necessary, the cooperating surfaces will be extremely smooth, and tolerances extremely tight. In less challenging applications, wider tolerances may be acceptable.

The cylinder 18 is located between the rod end cap 16 and the internal spline housing 20. The cylinder 18 is in the form of a tube, with a smooth internal surface. The rear of the rod end cap 16 (the left end as viewed in FIG. 3) includes an annular shoulder 40 which includes a groove to receive an O-ring 42 which seals the cylinder 18 to the rod end cap 16. The lead end of the internal spline housing 20 includes a similar or annular shoulder 44 and O-ring 46.

The piston rod assembly 14 includes three components. The first is the piston rod 50. The lead end portion 52 of the piston rod 50 includes pilot holes and various flats and threaded passages for securing a locating pin to the piston rod. These are conventional and need no further description. The lead end bearing surface 30 is immediately adjacent to lead end portion 52 of the piston rod.

A piston 54 is part of the piston rod assembly 14. The piston 54 is generally annular, and the piston rod 50 fits through a central opening 56 in the piston. On one side (to the left as viewed in FIG. 3) the piston 54 bears against a radial shoulder 58 formed on the piston rod 50. The piston 54 is pressed against the radial shoulder 58 by means of an internally threaded nut 60. This nut 60 has a smooth cylindrical outside surface, and performs an additional function as a sensor cap, as will be discussed below.

The piston 54 carries a pair of circumferential seals 62. The seals 62 ride against the interior surface of the cylinder 18 so that fluid pressure applied to one side of the piston causes the piston rod assembly 14 to move in one direction or the other without leakage between the piston 54 and the internal surface of the cylinder 18. The end of the piston rod 50 which is opposite the lead end portion 52 includes the external spline 38. During manufacturing, this external spline is rolled into the material of which the piston rod 50 is formed. Preferably, the piston rod is formed of steel, and after formation of the external spline 38 and external threads 68 for the nut 60, the entire piston rod 50 is heat treated with a ferritic nitrocarburization process. Suitable processes are commercially available, such as that sold by Dynamic Metal Treating, Inc. of Canton Township, Michigan under the mark Nitrowear.

Figure 3:
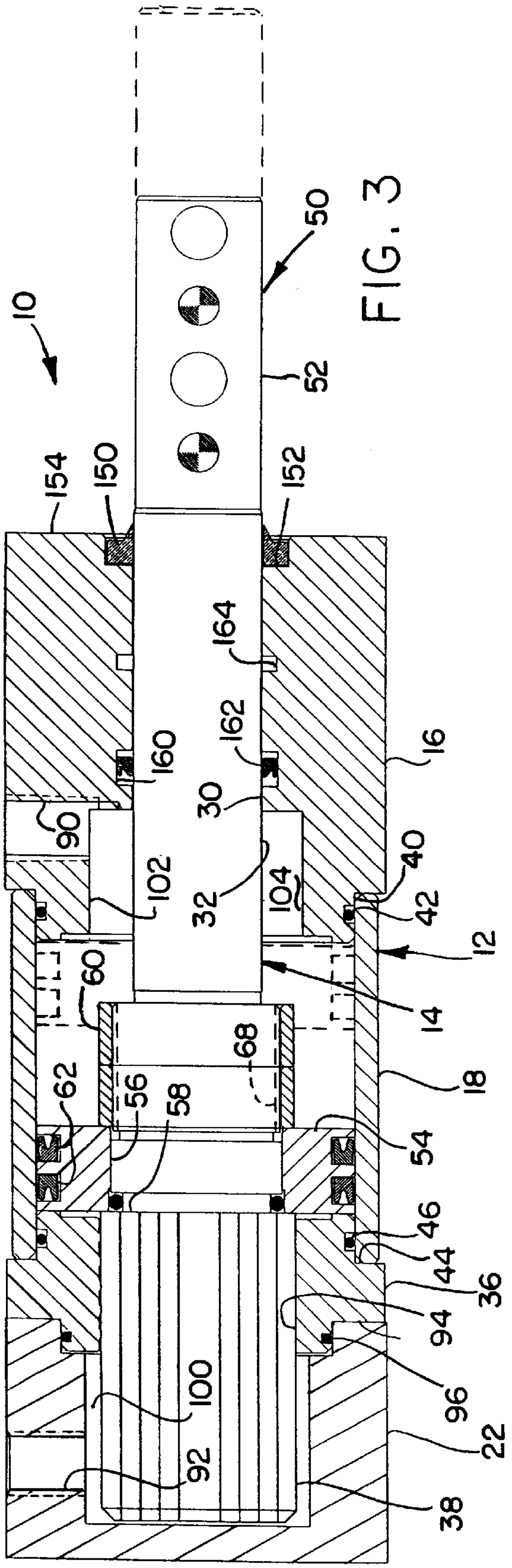
FIG. 3 is a view looking in the direction of arrows 3—3 of FIG. 2, and partially in cross section.
Figure 4:
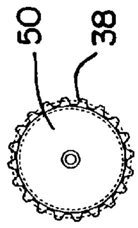
FIG. 4 is an end view of a piston rod having an external spline and forming a part of the linear actuator of FIG. 1.

In certain applications it may be desirable to include a sensor which is utilized to generate a signal when the actuator reaches either of its extreme positions. To accommodate such a sensor, openings 90 and 92 are formed in the rod end cap 16 and the rear cap 22, respectively. The sensor (not shown) may be a conventional proximity switch. The proximity switch generates a signal when the piston rod assembly 14 is within a predetermined distance of the switch. Commonly, the switches are selected and positioned to generate a signal only when the piston rod assembly 14 is in the fully retracted position (FIG. 3, solid lines) or in the fully extended position (FIG. 3, phantom lines). The switches must be accurately positioned with respect to the piston rod. In order to allow the same proximity switch to be used both in the rod end cap and the rear cap, the nut 60 is formed with a cylindrical outside surface which has the same diameter as the outside surface of the external spline 38. Accordingly, the same proximity switch may be installed in either opening 90 or 92.

The internal spline housing 20 includes an annular shoulder 94 on its rear (to the left is viewed in FIG. 3) surface which receives a corresponding stepped shoulder on the rear cap 22. A suitable seal such as O-ring 96 is provided to prevent leakage through the joint. When in place, the rear cap 22 forms a sealed chamber 100 surrounding the external spline 38. When fluid under pressure is introduced into chamber 100, the piston 50 is forced to the right as shown in FIG. 3, causing the piston to move to its extended position as shown in dotted lines. In order to facilitate this, the internal spline housing 22 (FIG. 5) includes a pair of through passages 98 which transmit fluid pressure from the chamber 100 around the splines 36 and 38 and against the piston 54.

Acounterbore 102 is formed in the end face of the rod end cap 16 closest to be piston 54. The counterbore 102 forms a chamber 104 which surrounds the cylindrical surface 32 of the piston rod 50. When the piston rod assembly 14 is in the extended position (FIG. 3, phantom lines), the nut ds6O is in the chamber 104. When fluid under pressure is introduced into the chamber 104, the piston rod 50 is forced to the retracted position by the action of the fluid pressure on the piston 54.

Figure 5:
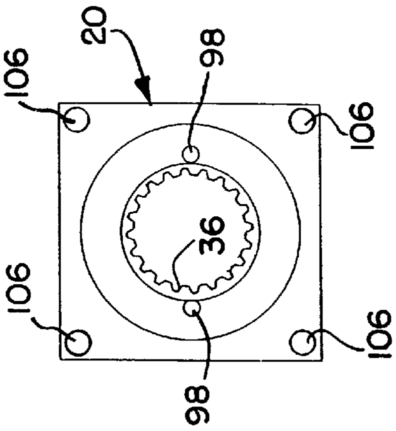
FIG. 5 illustrates an internal spline housing forming a part of the linear actuator of FIG. 1.

The rod end cap 16, the internal spline housing 20, and the rear 22 are all generally rectangular in cross section. FIG. 5 illustrates an end view of the internal spline housing 20. Holes 106 are bored through each of the corners of the internal spline housing 20. Similar holes (not shown) are formed in the rear cap 22. Bolts 108 (FIGS. 1, 2, and 7) extend through the holes in the rear cap 22, through the holes 106 in the spline housing 20 and into the rod end cap 16 where they are received in suitable threaded passages. These four bolts 108 pull the rod end cap 16 toward the rear cap 22, squeezing the spline housing 20 and cylinder 18 between them. Each of these components includes end faces which abut its neighbor. In addition, seals in the form of O-rings 96, 46, and 42 seal the connections between the rear cap 22, internal spline housing 20, cylinder 18, and rod end cap 16.

Figure 7:
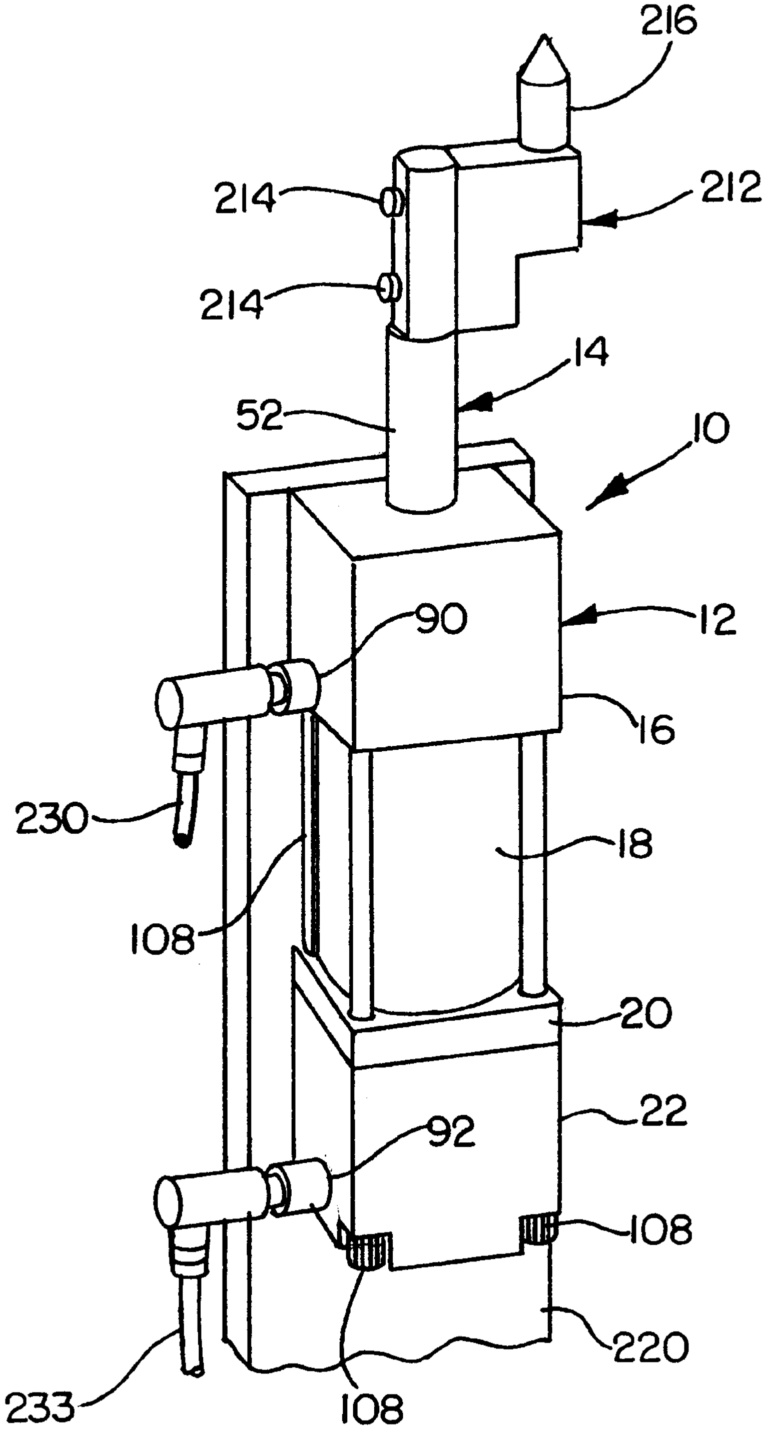
FIG. 7 illustrates the linear actuator of FIG. 1 mounted to a supporting structure and fitted with an offset locating pin.

The linear actuator 10 typically is mounted to a rigid frame element 220 (FIG. 7). To this end, the rod end cap 16 (FIG. 1) includes four threaded bores 110, 112, 114, and 116. In addition, a pair of pilot holes 118 and 120 are formed in the rod end cap 16. The pilot holes 118 and 120 receive positioning pins to accurately position the linear actuator 10 with respect to the associated framework such as frame element 220 (FIG. 7). The rear cap 22 is provided with threaded bores 122 and 124 (FIG. 1) so that it can be bolted to the same framework 220 (FIG. 7) as the rod end cap 16. The Frame element 220 provides structural rigidity which keeps the rear cap 22, the internal spline housing 20, and the rod end cap 16 in the proper angular alignment. Specifically, the framework prevents twisting of the rear cap 22, the internal spline housing 20, and rod end cap with respect to each other.

Figure 2:
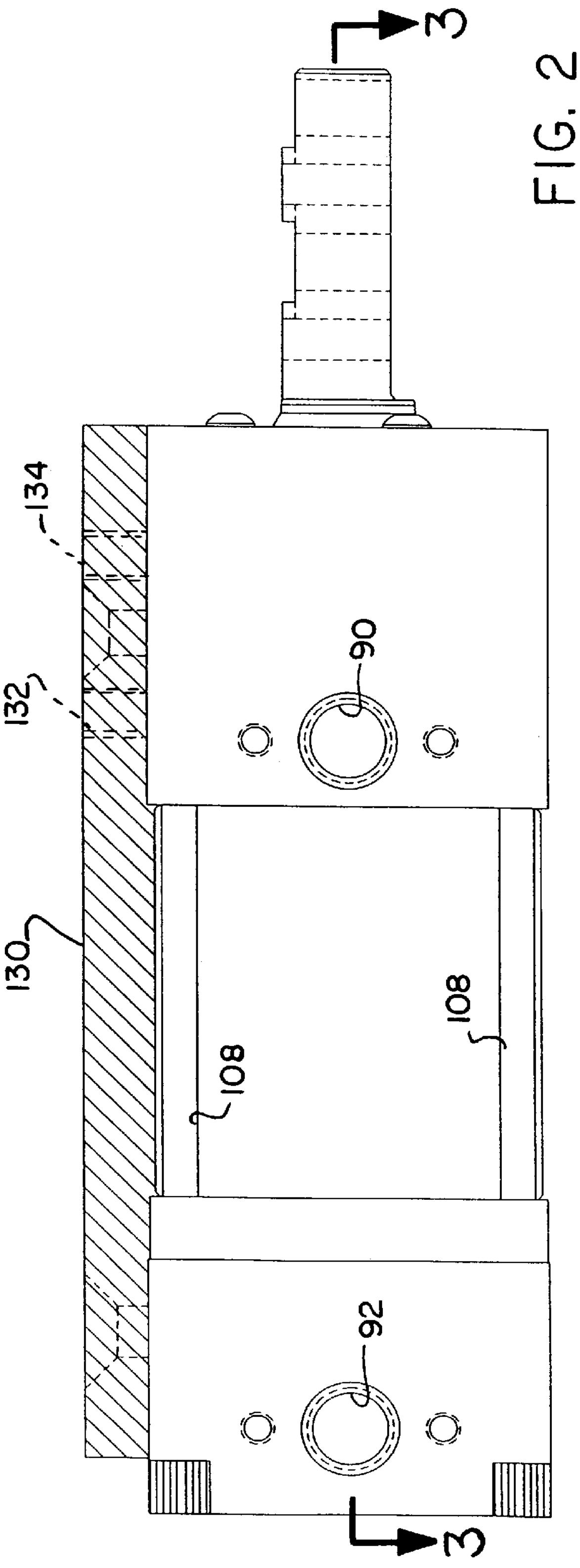
FIG. 2 is a side elevation view of the linear actuator of FIG. 1 and showing an optional support plate.

In some installations it may not be possible to mount both the rear cap 22 and the rod end cap 16 to a structural member to provide torsional resistance. In such situations, and optional support plate 130 (FIG. 2) is provided. The support plate 130 is initially secured to the rod end cap 16 by a machine screw which is screwed into a threaded bore 130 (FIG. 1) in the face of the rod end cap 116. The support plate 130 spans the space between the rod end cap 16 and the rear cap 22. It is secured to the rear cap 22 by two machine screws which are threaded into the bores 122 and 124 (FIG. 1). The support plate 130 is provided with four passages 132 and 134 (only two shown) which are aligned with the bores to 110 through 116. In addition there are passages which align with the pilot holes 120 and 118. In this way the rod end cap 16 can be bolted to the framework using the standard bolt pattern even when the support plate 130 is used. The optional support plate 130 provides torsional rigidity to keep the rear cap 22 and especially the internal spline housing 20 aligned with the rod end cap 16.

The rod end cap 16 is provided with a scraper seal 150 at its leading end. The scraper seal 150 is a conventional seal which is used in applications involving heavy concentrations of abrasive liquids or extremely find abrasive materials. Such a seal is necessary when the linear actuator 10 is used to position sheet metal parts during welding operations because welding creates tiny abrasive particles which could damage be actuator 10. The seal 150 is received in annular recess 152 formed in the leading and 154 of the rod end cap 16.

The rod end cap also includes an internal annular or recess 160. This recess receives a seal 162 which rides against the cylindrical surface 32 all of the piston rod 50. The seal 162 prevents leakage of fluid pressure from the chamber 104 defined by counter bore 102.

In order to lubricate the cylindrical surface 32 of the piston rod 50, an annular groove 164 is formed in the leading end bearing surface 30. This annular groove is filled with a suitable lubricant during assembly of the linear actuator 10.

Figure 6:
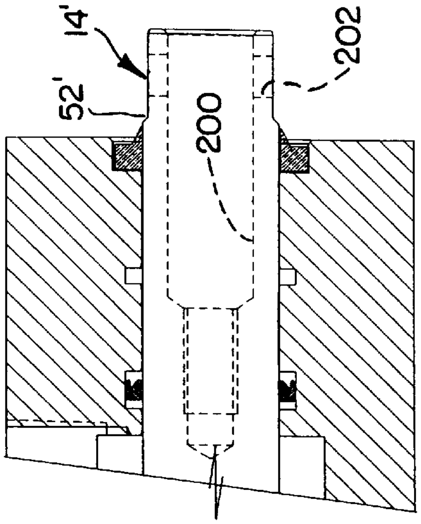
FIG. 6 illustrates a second embodiment of the linear actuator of FIG. 1.

FIG. 6 illustrates an embodiment of the present invention in which similar reference numerals with a prime (') are used to indicate corresponding parts. The FIG. 6 embodiment is intended for use with a locating pin that is coaxial with the piston rod assembly 14'. To this end the lead end portion 52' of the piston rod 50' is provided with end internal passage 200. The lead end portion 52' also includes a cross bore 202 to secure a locating pin to the piston rod assembly 14'.

Linear actuator 10 (FIG. 7) is also suitable for use with an off set locating pin 212. The offset pin 212 is secured to the lead end portion 52 of the piston rod assembly 14 by means all of two bolts 214. Because the pin 216 is offset from the axis of the piston rod 14, movement of the sheet metal (not shown) which the pin 216 engages can apply a torque to the piston rod 14 tending to rotate the piston rod about its longitudinal axis. However, this applied torque results in virtually no rotational movement of the piston rod 14. This is because the external splines 38 (FIG. 4) which are formed on the piston rod 14 slidingly engage with the internal splines 36 of the internal spline housing 20. The internal spline housing 20, in turn, is held against rotation by engagement of one of its outside surfaces with the frame member 220 (FIG. 7). The internal spline 36 and external spline 38 are manufactured with tolerances which are held to an extreme minimum so that there is only a clearance between the two which will allow sliding. This construction allows an offset pin 216 (illustrated in FIG. 7) to be repeatedly positioned accurately even though it is subjected to forces which could apply substantial torques to the piston rod 14.

As shown in FIG. 7, fluid supply lines 230 and 232 are connected to the threaded passages 90 and 92 to supply fluid under pressure to the chambers 104 and 100, respectively. The rod end cap 16 and the rear cap 22 may be provided with additional openings similar to the openings 90 and 92 to mount proximity switches, and typically such openings will be provided on all faces of the rod end cap and rear cap except the top faces shown in FIG. 1 which include the mounting holes 110, 112, 114, 116, 124 and 126. In this way openings for proximity switches are available to suit the convenience of the particular application, and unused holes can be plugged.

Thus it is clear that the present invention provides a linear actuator 10 (FIG. 7) which is compact and precisely positions a locating pin 216, even when the pin is offset from the axis of the actuator. The actuator 10 includes a housing assembly 12 with a cylinder 18 between a pair of bearing surfaces 30 and 36. A piston rod assembly 14 moves linearly within the housing 12 when fluid pressure is applied. One end of the piston rod assembly (the lead end) has a cylindrical exterior surface 32 which is a sliding fit with a corresponding bearing surface 30 in the housing assembly. The rear end of the piston rod assembly is formed with an external spline 38. This spline 38 meshes with a corresponding internal spline 36 formed in the rear end of the housing assembly to support the piston rod assembly 14 against side to side movement and against rotation. A piston 54 is connected rigidly to the piston rod 50 between the two bearing surfaces. The lead end bearing surface 30 may be applied directly to the base metal of a component 16 of the housing assembly 12 rather than being a separate piece to decrease cost and increase rigidity.

What is claimed is:

1. A locating pin actuator for positioning a sheet metal locating pin, said actuator comprising a cylinder body defining an internal bore, a piston slidable within the bore in response to fluid pressure, and piston rod connected to the piston;

the cylinder body including a rod end cap having a first passage through which a first end of the piston rod extends and a rear cap having a second passage coaxial through which a second end of the piston rod extends; and the second passage having a plurality of internal splines and the second end of the piston rod including a plurality of external splines that mate with the internal splines to enable axial sliding but limiting rotation of the piston rod.

2. A locating pin actuator as set forth in claim 1 wherein the first and second passages form bearing surfaces which support the piston rod for axial sliding movement and wherein these bearing surfaces are separated by a distance at least the length of the piston's stroke.

3. A locating pin actuator as set forth in claim 1 wherein the piston rod is formed of a single piece of metal.

4. A locating pin actuator as set forth in claim 2 wherein the piston rod is formed of a single piece of metal.

5. A locating pin actuator for positioning a sheet metal locating pin, said actuator comprising:

a body having a bore, a piston slidable within the bore in response to fluid pressure applied to the piston, a piston slidable within the bore in response to fluid pressure applied to the piston, an axially extending piston rod connected to the piston and having first and second ends on opposite sides of the piston, the second end of the piston rod including a plurality of external splines, a rod end cap mounted to the body and having a first passage through which the first end of the piston rod extends, a rear cap mounted to the body and having a second passage coaxial with the first passage, the second end of the rod extending into the second passage, at least a portion of the second passage including a plurality of internal splines that mesh with the external splines on the rod and enabling axial sliding while limiting rotation of the rod about its axis, the rod end cap and rear cap being connected to the body at opposite ends of the bore.

6. The actuator of claim 5 wherein the piston rod is formed of a single piece of metal.

7. The actuator of claim 5 wherein the piston has a stroke between extreme positions and the first and second passages each have bearing surfaces supporting the piston rod for axial sliding movement, the bearing surfaces being separated axially at least by the length of the piston stroke.

8. The actuator of claim 5 wherein the first end of the piston rod is cylindrical with a first cross section and the second end of the piston rod is cylindrical with a second, larger cross section, the piston rod having an annular shoulder between the first and second ends, the piston having a central opening through which the piston rod extends, the shoulder on the piston rod limiting movement of the piston on the rod in one axial direction.

9. The actuator of claim 8 wherein the piston rod includes a threaded portion between the first and second ends, and a nut threaded onto the threaded portion, the nut limiting movement of the piston on the piston rod in an axial direction opposite from the one axial direction.

10. A piston and cylinder assembly for use in actuating a locating pin for sheet metal, said assembly comprising:

a cylinder body assembly having an internal bore, a piston axially slidable within the bore, a piston rod connected with the piston, the piston rod having a free end for connection of a sheet metal locating pin, a first guide surface formed within the cylinder body assembly, a second guide surface on one of the piston and piston rod, the first and second guide surfaces being part of a set of cooperating splines cooperating to prevent rotation of the piston and piston rod as the piston and piston rod slide axially with respect to the cylinder body assembly, first and second bearings connected to the cylinder body assembly supporting the piston rod for straight line movement, the first and second bearings being located on opposite sides of the piston.

11. The assembly of claim 10 wherein the second guide surface is part of the second bearing.

12. The assembly of claim 10 wherein the cylinder body assembly includes a cylinder body having an internal cylindrical bore, a rod end cap and a rear cap assembly, the free end of the piston rod extending through the rod end cap, the first bearing being formed in the rod end cap and the second bearing being formed in the rear cap assembly.

13. The assembly of claim 12 wherein the second guide surface is part of the second bearing.

14. The assembly of claim 13 wherein the rear cap assembly includes an internal spline and the second guide surface forms a part of the internal spline.

15. The assembly of claim 12 wherein the bore in the cylinder body extends through the cylinder body the rod end cap assembly closes one end of the bore through the cylinder body and includes a first passage through which fluid pressure is applied to a first side of the piston to move the piston within the bore.

16. The assembly of claim 15 wherein and the rear cap assembly closes the other end of the bore, the rear cap assembly including a second passage through which fluid pressure is applied to the other side of the piston to move the piston within the bore.

17. The assembly of claim 16 wherein the rear cap assembly includes an internal spline and the second surface is a part of the internal spline.

18. The assembly of claim 10 wherein the piston rod includes a splined end portion having an external spline, the cylinder body assembly includes an internal spline mating with the external spline of the piston rod, the piston rod having a threaded portion between the splined end portion and the free end, the piston being secured to the piston rod by means of the threaded portion of the piston rod.

19. The assembly of claim 18 wherein the piston rod is formed of a single piece of metal.

* * * * *